US012767808B2

(12) United States Patent
Jeon et al.

(10) Patent No.: US 12,767,808 B2
(45) Date of Patent: Oct. 20, 2026

(54) CORE-SHELL-TYPE FLUORINE-BASED RESIN PARTICLES HAVING IMPROVED FLOWABILITY AND COHESION PROPERTIES

(71) Applicant: LX MMA CORP., Jeollanam-do (KR)

(72) Inventors: Seong Jang Jeon, Daejeon (KR); Bub Sung Kim, Daejeon (KR); Da Hyun Kang, Daejeon (KR); Sung Il Park, Daejeon (KR)

(73) Assignee: LX MMA CORP., Jeollanam-do (KR)

( * ) Notice: Subject to any disclaimer, the term of this patent is extended or adjusted under 35 U.S.C. 154(b) by 0 days.

(21) Appl. No.: 18/879,786

(22) PCT Filed: May 3, 2023

(86) PCT No.: PCT/KR2023/006021
§ 371 (c)(1),
(2) Date: Dec. 29, 2024

(87) PCT Pub. No.: WO2024/005345
PCT Pub. Date: Jan. 4, 2024

(65) Prior Publication Data

US 2025/0257204 A1 Aug. 14, 2025

(30) Foreign Application Priority Data

Jun. 29, 2022 (KR) ........................ 10-2022-0079890

(51) Int. Cl.
*C08L 27/18* (2006.01)
*C08L 33/12* (2006.01)

(52) U.S. Cl.
CPC ............... *C08L 27/18* (2013.01); *C08L 33/12* (2013.01); *C08L 2201/50* (2013.01); *C08L 2203/20* (2013.01); *C08L 2207/53* (2013.01)

(58) Field of Classification Search
CPC ....... C08L 2207/53; C08L 27/18; C08L 33/12
See application file for complete search history.

(56) References Cited

FOREIGN PATENT DOCUMENTS

| | | | | |
|---|---|---|---|---|
| CN | 104143615 | B | 8/2016 | |
| CN | 110818844 | A | 2/2020 | |
| CN | 114437480 | A | 5/2022 | |
| EP | 3 702 385 | A1 | 9/2020 | |
| EP | 4039716 | A1 * | 8/2022 | .............. C08F 14/26 |
| JP | 2010-534740 | A | 11/2010 | |
| KR | 10-2012-0094003 | A | 8/2012 | |
| KR | 10-2012-0103856 | A | 9/2012 | |
| KR | 10-2015-0142906 | A | 12/2015 | |
| KR | 10-2018-0059433 | A | 6/2018 | |
| WO | 2006/127317 | A1 | 11/2006 | |

OTHER PUBLICATIONS

International Search Report issued in PCT/KR2023/006021 dated Aug. 7, 2023.
Written Opinion issued in PCT/KR2023/006021 dated Aug. 7, 2023.
Notice of Decision to grant Patent, issued in KR 10-2022-0079890 dated Feb. 28, 2023.
Extended European Search Report dated Oct. 31, 2025 issued in corresponding European Patent Application No. 23831709.3.

* cited by examiner

*Primary Examiner* — Wenwen Cai
(74) *Attorney, Agent, or Firm* — Blank Rome LLP

(57) ABSTRACT

A dispersion includes core-shell-type fluorine-based resin particles having improved flowability and cohesion properties. The particles, a mixture or slurry (dispersion) including the particles, and a preparation method for the particles, mixture, and slurry. The particles each have an acryl monomer added to a perfluorinated polymer particle dispersion so as to have a perfluorinated polymer core and an acrylic polymer shell.

7 Claims, 2 Drawing Sheets

[FIG. 1]
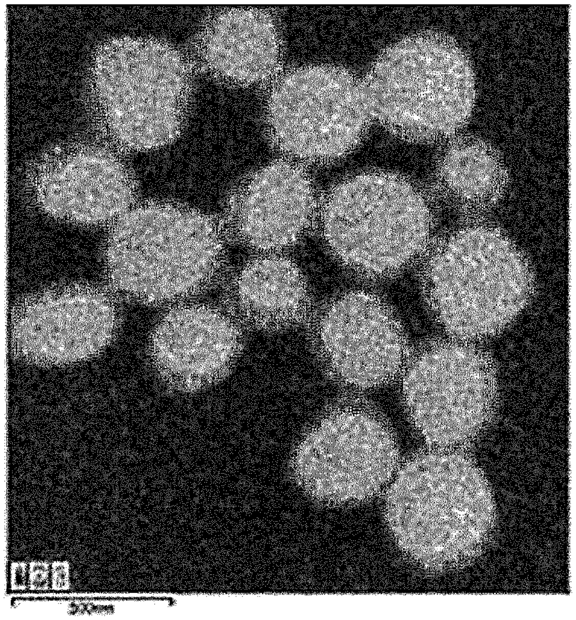
[FIG. 2]
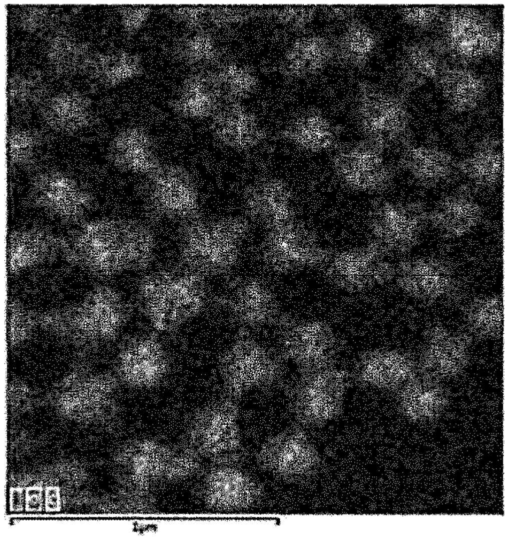

[FIG. 3]
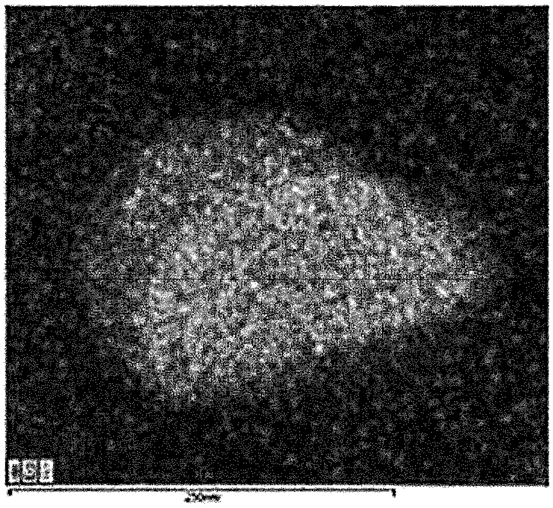

CORE-SHELL-TYPE FLUORINE-BASED RESIN PARTICLES HAVING IMPROVED FLOWABILITY AND COHESION PROPERTIES

CROSS-REFERENCE TO RELATED APPLICATIONS

The present application is a U.S. National Stage of International Patent Application No. PCT/KR2023/006021, filed May 3, 2023, which claims priority to Korean Patent Application No. 10-2022-0079890, filed Jun. 29, 2022, the disclosures of which are hereby incorporated by reference in their entireties.

TECHNICAL FIELD

The present invention relates to a dispersion including core-shell-type fluorine-based resin particles having improved flowability and cohesion properties.

An exemplary embodiment provides particles having a perfluorine-based polymer core and an acryl-based polymer shell by adding an acryl monomer to a perfluorinated polymer particle dispersion, a mixture or slurry (dispersion) including the particles, and a method for preparing the same.

In the core-shell-type particles having a perfluorinated resin core and a polymethylmethacrylate-based resin shell prepared by the method, the entire surface of the core is well covered with a uniform thickness of a shell resin.

In addition, since the core-shell-type particles have a uniform particle size, and also have excellent flowability and low cohesion properties, they are characterized in that a PTFE fiberization point may be controlled according to user's intention.

BACKGROUND ART

A perfluorinated polymer including polytetrafluoroethylene (PTFE) has uses as various adhesives, process improvement agents, and fluidizers due to electrical properties, thermal properties, and adhesive properties, in the coating of a semiconductor manufacturing device and the like, has uses as a coating material in various substrates in an electric storage device and the like, and also has uses with other materials as an adhesive material.

However, the perfluorinated resin particles themselves still lack adhesion to other materials such as a film of a polymerization resin, an electrode, or the like, and in order to solve the problem, a technology of preparing core-shell particles including the fluorinated resin particle surface layer and a non-fluorine-based resin as a shell layer was developed for improving the surface properties while using the nature of the perfluorinated resin particles as they are.

However, conventional core-shell particles also still have increased cohesion properties rather than dispersibility and lack flowability of a slurry when actually used, and also, has limitation in showing sufficient performance by cohesion between the particles. In addition, it is difficult to obtain a shell layer which is formed evenly on the entire surface of the perfluorinated resin particle as a core, and it is difficult to adjust the physical properties.

DISCLOSURE

Technical Problem

An object of the present invention is to provide core-shell-type having excellent dispersibility particles including a perfluorinated resin core and a polymethylmethacrylate-based resin shell, which has a specific energy (cohesive energy) value of 10 mJ/g or less and a total energy value of 2000 mJ or less, when a sample cylinder having a diameter of 50 mm is filled with a core-shell resin, the total energy is measured 11 times while an impeller is rotated and lowered simultaneously at a tip speed of 100 mm/s, and a cohesive energy is measured while the impeller rises, using a flow rheometer (Powder Rheometer) FT4 available from Freeman Technology.

Therefore, an object of the present invention is to provide core-shell particles including a perfluorinated resin core having low cohesion properties between particles and an acryl-based polymer shell.

Another object of the present invention is to provide core-shell particles including a perfluorinated resin core having a particle size of 100 to 500 nm and the polymethylmethacrylate-based resin shell.

Still another object of the present invention is to provide an excellent particle form which allows obtainment of core-shell particles in which the entire area of the core is evenly covered with a shell layer.

Technical Solution

As a result of studying to achieve the above objects, it was found that emulsion polymerization of an acryl-based polymer is performed in the presence of a perfluorinated polymer particle slurry to prepare polymer particles having core-shell and a slurry including the particles, in which the core-shell particles and a mixture or slurry including the particles may be prepared by performing the emulsion polymerization using polyethylene glycol ether having a $C_8$ or higher alkyl group substituted by one or more alkyls of the following Chemical Formula 1 as an emulsifier, thereby completing the present invention:

$$R—(—O—C_2H_4—)_n—OH \quad \text{[Chemical Formula 1]}$$

wherein R is a $C_8$ or higher alkyl group substituted by one or more alkyls, and n is an integer of 5 to 15.

As an exemplary embodiment, R may be an alkyl group substituted by one or more $C_8$ to $C_{30}$ alkyl groups.

In an exemplary embodiment, in Chemical Formula 1, a ratio between a molecular weight of an oxyethylene group as a hydrophilic group and a total molecular weight ([molecular weight of oxyethylene chain]/[total molecular weight]) may be 0.5 to 1.0.

As an exemplary embodiment, Chemical Formula 1 may be the following Chemical Formula 2:

[Chemical Formula 2]

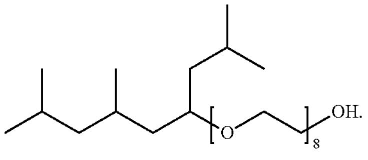

As an exemplary embodiment, the core-shell particles having the perfluorinated polymer core and the acryl-based polymer shell may be prepared by emulsion polymerization of the acryl-based monomer using the polyethylene glycol ether having a $C_8$ or higher alkyl group substituted by one or more alkyls of Chemical Formula 1 as an emulsifier, in a seed slurry including perfluorinated particles (hereinafter, referred to as "perfluorinated resin particle slurry").

As an exemplary embodiment, the perfluorinated resin particle slurry may be a slurry including perfluorinated resin particles including a tetrafluoroethylene-derived unit as a main component.

As an exemplary embodiment, the polymethylmethacrylate-based resin shell layer of the composite core-shell particle slurry may include 60 wt % or more of methylmethacrylate.

In one general aspect, composite core-shell particles having perfluorinated resin core-polymethylmethacrylate-based resin shell and a slurry including the particles, which are prepared by emulsion polymerization of an acryl-based monomer using polyethylene glycol ether having a $C_8$ or higher alkyl group substituted by one or more alkyls of the following Chemical Formula 1 as an emulsifier, in a perfluorinated resin particle slurry, are provided:

$$R—(—O—C_2H_4—)_n—OH \quad \text{[Chemical Formula 1]}$$

wherein R is a $C_8$ or higher alkyl group substituted by one or more alkyls, and n is an integer of 5 to 15.

As an exemplary embodiment, the composite core-shell particles may have a cohesive energy of 10 mJ/g or less.

As an exemplary embodiment, the composite core-shell particles may have a total surface energy of 2,000 mJ or less.

In an exemplary embodiment, the composite core-shell particles may have a particle diameter of 100 to 500 nm.

In an exemplary embodiment, a core weight of the composite core-shell particle may be 50 to 95 wt %, preferably 60 to 80 wt % of the total core-shell particle.

In an exemplary embodiment, the core-shell slurry may be a slurry for forming an electrode including the core-shell particles and an electrode active material or a blend including the particles.

In another general aspect, a battery manufactured using the core-shell particles as a binder of the electrode active material is provided.

In another general aspect, composite core-shell particles having perfluorinated resin core-polymethylmethacrylate-based resin shell, which has a cohesive energy of 10 mJ/g or less and a total surface energy of 2,000 mJ or less, are provided.

In an exemplary embodiment, the core-shell particles may have an average diameter of 100 to 500 nm.

In an exemplary embodiment, an average diameter of the core of the core-shell particles may be 50 nm or more and less than 500 nm, and a thickness of the shell of the core-shell particles may be 1 to 300 nm.

In still another general aspect, a water dispersion slurry includes the composite core-shell particles.

In an exemplary embodiment, the water dispersion slurry may further includes an electrode active material.

Advantageous Effects

The core-shell polymerization particles formed of the perfluorinated resin core and the polymethylmethacrylate-based resin prepared according to the preparation method of an exemplary embodiment may have excellent dispersion properties and minimize production of an aggregate.

The core-shell-type particles according to the preparation method of an exemplary embodiment may produce particles having excellent particle size uniformity while having a large particle diameter of 100 to 500 nm.

The core-shell particles according to an exemplary embodiment having low cohesive energy and excellent dispersibility, have a specific energy (cohesive energy) value of 10 mJ/g or less and a total energy value of 2000 mJ or less, when a sample cylinder having a diameter of 50 mm is filled with a core-shell resin, the total energy is measured 11 times while an impeller is rotated and lowered simultaneously at a tip speed of 100 mm/s, and a cohesive energy is measured while the impeller rises, using a flow rheometer (Powder Rheometer) FT4 available from Freeman Technology.

Therefore, the particles may be uniformly mixed with excellent dispersibility, when mixed with other particles, and when the particles are used as a binder, binding properties may be very uniformly provided, and also, it may be easy to adjust a binding force depending on the content.

In addition, core-shell particles having excellent properties in which the entire area of the core is evenly covered with the shell layer may be obtained.

DESCRIPTION OF DRAWINGS

FIG. 1 is a TEM/EDS image of Example 1.

FIG. 2 is a TEM/EDS image of Comparative Example 2.

FIG. 3 is a TEM/EDS image of Comparative Example 2.

BEST MODE

The particles of the present invention are core-shell-type particles having a core including a perfluorinated polymer and a shell layer including a polymethylmethacrylate-based resin, and core-shell particles having a particle diameter of 100 to 500 nm and a low cohesive energy are provided.

A conventional core-shell structure including a core of a perfluorinated polymer and a shell of a non-fluorine resin is described in, for example, U.S. Pat. No. 6,841,594, but since the cohesive energy of the particles prepared by the method is high, the particles are aggregated with other inorganic particles or in a slurry state, so that they are not sufficiently dispersed. That is, the particles show a characteristic of an excessively high cohesive energy.

However, the particle size of the core-shell particles according to the present exemplary embodiment may be adjusted to a size of 100 nm to 500 nm and the size of the prepared particles is uniform, and the core-shell particles having resistance to cohesion, which has a specific energy (cohesive energy) value of 10 mJ/g or less and a total energy value of 2000 mJ or less, when a sample cylinder having a diameter of 50 mm is filled with a core-shell resin, the total energy is measured 11 times while an impeller is rotated and lowered simultaneously at a tip speed of 100 mm/s, and a cohesive energy is measured while the impeller rises, using a flow rheometer (Powder Rheometer) FT4 available from Freeman Technology, may be provided.

Preferably, the core-shell particles having resistance to cohesion, which have a specific energy (cohesive energy) value of 6 mJ/g or less and a total energy value of 1,200 mJ or less, may be provided.

In addition, the core-shell particles according to an exemplary embodiment may provide an excellent particle form which allows obtainment of core-shell particles in which the entire area of the core is evenly covered with a shell layer.

In an exemplary embodiment, the polymer or copolymer forming the core part is not particularly limited as long as it is a perfluorinated unsaturated monomer, but, for example, may be one or two or more selected from a polymer prepared from a monomer selected from tetrafluoroethylene (TFE), perfluoro (alkyl vinyl ether), hexafluoropropylene, and the like, or a copolymer thereof, and a resin forming the shell may be a polymethylmethacrylate-based resin.

In an exemplary embodiment, the polymer forming the core part of the core-shell particles may be a polymer or copolymer including 90% or more or all of the perfluorinated unsaturated monomer, and the polymethylmethacrylate-based resin forming the shell may include 50 wt % or more, 60 wt % or more, 70 wt % or more, 80 wt % or more, 90 wt % or more, or 100 wt % of the methylmethacrylate monomer.

An example of the perfluorinated polymer forming the core part may be polytetrafluoroethylene (PTFE), tetrafluoroethylene (TFE)/perfluoro (alkylvinyl ether) copolymer (PFA), or TFE/hexafluoropropylene copolymer (PEP), but is not limited thereto, and in terms of physical properties, a PTFE homopolymer is more preferred, but the present invention is not limited thereto.

In an exemplary embodiment, the core material may be synthesized, but when the MMA-based acryl monomer is added to a perfluorinated resin slurry such as a conventional commercialized PTFE aqueous solution slurry and emulsion polymerization is performed using the emulsifier of Chemical Formula 1, cohesion properties to be intended in the present invention are significantly reduced and core-shell particles having a uniform particle diameter of 100 to 500 nm may be obtained.

When the perfluorinated resin slurry is prepared by polymerization, it may be prepared by a previously known method such as a method of mixing the perfluorinated unsaturated monomer and an additive such as a polymerization initiator in appropriate amounts and performing emulsion polymerization, solution polymerization, or suspension polymerization.

The methylmethacrylate-based resin as the resin for forming the shell is prepared by including 50 wt % or more, preferably 70 wt % or more of a methylmethacrylate monomer, and in the case of a copolymer including the monomer, one or two or more selected from acrylonitrile, vinyl acetate, a styrene-based monomer, vinyl chloride, acrylic acid ester, vinylidene chloride, acrylic acid, methacrylic acid, and the like are preferred as a monomer, but is not particularly limited.

Next, the method for preparing core-shell particles according to an exemplary embodiment will be described.

The method for preparing the perfluorinated resin core-polymethylmethacrylate-based shell particles according to an exemplary embodiment may include adding an emulsifier of the following Chemical Formula 1 to a perfluorinated resin slurry solution to perform dispersion or emulsification, and then adding MMA or a monomer composition including MMA as a main component to perform emulsion polymerization:

$R—(—O—C_2H_4—)_n—OH$ [Chemical Formula 1]

wherein R is a $C_8$ or higher alkyl group substituted by one or more alkyls, and n is an integer of 5 to 15.

As an exemplary embodiment, R may be an alkyl group substituted by one or more $C_8$ to $C_{30}$ alkyl groups.

In Chemical Formula 1, the cohesive energy value is lower in the range of a ratio of the molecular weight of the hydrophilic oxyethylene group and the total molecular weight ([molecular weight of oxyethylene chain]/[total molecular weight]) of 0.5 to 1.0, which is thus more preferred, but the present invention is not limited thereto.

An example of Chemical Formula 1 may be the following Chemical Formula 2:

[Chemical Formula 2]

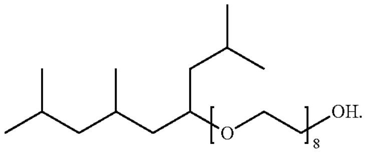

Hereinafter, a method for preparing core-shell particles will be described in detail.

As an exemplary embodiment, the preparation method may be adding methylmethacrylate or a monomer including methylmethacrylate as a main component to a perfluorinated resin slurry to perform polymerization in the presence of the emulsifier of Chemical Formula 1.

Polymerization may be performed by adding MMA or a monomer composition including MMA as a main component to the perfluorinated resin slurry before polymerization or by continuously or stepwisely adding the monomer or the monomer composition, but continuous addition may be more preferred for uniform particle size.

The emulsifier of Chemical Formula 1 may be used alone or mixed with other emulsifiers, but being used alone is more preferred in terms of the effect of reducing a cohesive energy, but mixing is also preferred in terms of proper adjustment.

The emulsifier may be continuously or intermittently added to the perfluorinated resin particle slurry with the monomer, or the monomer may be added after adding the emulsifier in advance.

The content of the emulsifier of Chemical Formula 1 may be 0.05 to 10 parts by weight, 0.1 to 6 parts by weight, or 0.5 to 2 parts by weight with respect to 100 parts by weight of particles formed of a perfluorinated polymer, but is not limited depending on the size of the particles.

In addition, as an exemplary embodiment, a chain transfer agent, a chelating agent, a pH regulator, and the like may be added as needed during the emulsion polymerization.

The chain transfer agent may be, for example, mercaptans such as n-octyl mercaptan, n-dodecyl mercaptan, tert-dodecyl mercaptan, but is not limited thereto. The content of the chain transfer agent is not limited, but, for example, may be used at 0.001 to 2 parts by weight with respect to 100 parts by weight of a monomer or monomer mixture.

A polymerization temperature during emulsion polymerization may be, for example, 5 to 100° C., preferably 30 to 80° C. and a polymerization time may be 1 to 24 hours, but they are not limited thereto.

As an exemplary embodiment, the core-shell slurry which is polymerized in the form of core-shell may have a solid content of 5 to 60 wt %, 10 to 50 wt %, 20 to 40 wt %, or a value between the numbers, but since it may be selected as needed, it is not limited thereto.

As an exemplary embodiment, the core-shell slurry is preferably an aqueous slurry. Of course, when it is dispersed only in water, it is more environmentally friendly, but a solvent miscible with water may be further included, if necessary. The mixed solvent may include one or a mixed solvent of two or more selected from polar ethers such as ketone, acetone, alkyl ester, N-methylpyrrolidone, and esters such as diethylene tetrahydrofuran, carbonate carbonate, and the like, but is not limited thereto.

As an exemplary embodiment, the perfluorinated resin particles included in the perfluorinated resin slurry forming the core part may have an average diameter of 50 nm or more, 100 nm or more, 150 nm or more, 200 nm or more, 250 nm or more, 300 nm or more, 350 nm or more, 400 nm or more, 450 nm or more and less than 500 nm, or a size between the numbers. The size and distribution of the particles having the diameter may be measured using NICOMP 380 (Entegris, dynamic light scattering) after diluting a polymerized latex slurry 1,000-fold.

In an exemplary embodiment, the core weight of the composite core-shell particle may be 50 to 95 wt %, preferably 60 to 80 wt % of the total core-shell particle.

In an exemplary embodiment, the shell layer may have a thickness of 1 to 300 nm. It may be preferably 5 to 200 nm and more preferably 10 to 150 nm. The thickness is preferred since dispersibility, low cohesion properties, and excellent electrical properties when used as a battery material may be expressed.

Though the radius of the core and the thickness of the shell are not particularly limited, the radius of the core and the thickness of the shell may be, for example, 1:0.01 to 1 or 1:0.05 to 0.6, but are not particularly limited as long as the object of the present invention is achieved.

The core-shell particles may be used in an electrode binder of a secondary battery, a processed fluidizing agent, or an emulsifying paint.

Hereinafter, the present disclosure will be described in more detail with reference to the examples and the comparative examples. However, the following examples and comparative examples are only an example for describing the present disclosure in more detail, and do not limit the present disclosure in any way.

The methods for evaluating physical properties in the present invention are as follows.

1. Measurement of Total Solid Content 15 g of a polymerized slurry was weighed on an aluminum dish and dried in an oven at 80° C. for 24 hours, and then the weight after drying was measured. A total solid content was calculated as (weight after drying−dish weight)/initial weight×100.

2. Extraction Method of Non-Fluorine-Based Resin 100 g of a polymerized slurry was placed in a 250 ml of a centrifuge tube and centrifugation was performed at 9,000 rpm for 30 minutes. The separated supernatant was discarded, 100 g of acetone was added to the remaining solid, and shaking was performed with a shaker for 3 hours so that a non-fluorine-based resin was extracted with acetone. After the shaking for 3 hours, centrifugation was performed again at 9,000 rpm for 30 minutes, and the fluorine-based resin was aggregated at the bottom and an acetone supernatant in which the non-fluorine-based resin was dissolved was separated. The separated supernatant in which the non-fluorine-based resin was dissolved was added dropwise to 400 g of methanol to obtain the precipitated non-fluorine-based resin. The precipitated non-fluorine-based resin was separated using a reduced pressure filter, washed 3 times with methanol, placed in a separate beaker, and dried in an oven at 80° C. for 24 hours.

3. Weight Average Molecular Weight (Mw) [Kg/Mol]

In order to measure the molecular weight of the non-fluorine-based resin of the slurry prepared in the example and the comparative examples, 10 mg of the extracted non-fluorine-based resin was dissolved in 10 ml of tetrahydrofuran (THF), respectively and filtered using a 0.2 μm teflon filter, and the molecular weight was measured using gel permeation chromatography (GPC) available from Waters.

4. Glass Transition Temperature (Tg) [° C.]

The measurement was performed on the non-fluorine-based resin extracted from the slurries prepared in the example and the comparative examples over 2 cycles under the heating conditions of 10° C. per minute using a differential scanning calorimetery (TA, Q20 DSC), and then the glass transition temperature was calculated by a half Cp method with an inflection point of the second cycle.

5. Measurement of Ratio Between Fluorine-Based Resin and Non-Fluorine-Based Resin 15 g of the polymerized slurry was placed on an aluminum dish and dried in an oven at 80° C. 10 mg of the dried powder was heated to 600° C. at 10° C. per minute through TGA and a decreased weight was measured. A ratio between the fluorine-based resin and the non-fluorine-based resin was measured from a weight decrease degree using the characteristics of the non-fluorine-based resin of being thermally decomposed first.

6. Measurement of Particle Size

The polymerized latex was diluted 1,000-fold and the size and distribution of the particles were measured using NICOMP 380 (Entegris, dynamic light scattering).

7. Measurement of Flowability Total Energy and Cohesive Energy (Specific Energy)

The polymerized slurry was freeze-dried to obtain a powder state, and flowability and a cohesive energy were measured from FT4 flow rheometer (Powder Rheometer) available from Freeman Technology. A sample cylinder having a diameter of 50 mm was filled with a resin, and the total energy was measured 11 times while an impeller was rotated and lowered simultaneously at a tip speed of 100 mm/s and a cohesive energy was measured while the impeller rose. When the specific energy value was less than 5, it was determined as low cohesion, when more than 5 and less than 10, it was determined as moderate cohesion, and when more than 10, it was determined as high cohesion. The measurement results up to 8 times were averaged in both total energy and specific energy as long as the equipment was operated properly.

8. Analysis of Particle Structure (TEM/EDS)

One drop of the slurry was dropped onto a transmission electron microscope (TEM) grid after plasma treatment. The structure of the dried sample was analyzed at a TEM/EDS (FEI, TECNAI TF20) acceleration voltage of 200 kV.

Example 1

A PTFE aqueous dispersion having an average particle diameter of 0.21 μm, a solid content concentration of 30%, and a standard specific gravity (SSG) of 2.16 to 2.22 was prepared. Subsequently, 2448.0 g of a PTFE dispersant and 48.92 g of a polyethylene glycol triphenylnonyl ether 90% aqueous solution having the molecular weight of an ethylene glycol repeating unit showing hydrophilicity of 384 g/mol were added to a 4 liter reactor, stirred at a speed of 350 RPM, and simultaneously heated to 75° C. with nitrogen bubbling.

After the temperature reached 75° C. as a polymerization temperature, nitrogen bubbling was stopped, and after 15 minutes, 183.86 g of a monomer mixed solution formed of 146.88 g of methylmethacrylate (MMA), 36.72 g of butyl acrylate (nBA), and 0.26 g of normal octyl mercaptan was added dropwise to the reactor over 15 minutes.

15 minutes after adding the monomer mixed solution, an aqueous solution of 68.4 g of distilled water and 0.92 g of potassium persulfate were added dropwise to the reactor over about 10 minutes. The polymerization reaction proceeded for 3 hours from the end of the addition of potassium persulfate, and then cooling to 30° C. was performed to obtain a white emulsion.

The size of the white emulsion was analyzed by NiCOMP and is shown in Table 1, and the results of particle structure analysis are shown in FIG. 1. As shown in FIG. 1, it was found that the polymethylmethacrylate shell was uniformly formed on the entire surface of the core, and also the particle size was very uniformly produced.

In addition, the emulsion was freeze-dried for 72 hours under the conditions of −60° C. and 10 mTorr to obtain white powder, and the results of measuring the total energy and the specific energy using the powder are shown in Table 1. As a result, it was found that the results were excellent, since the specific energy (mJ/g) was 5.8, which was very low, and the total energy was 1, 150 mJ which was very lower than 2,000 mJ or less.

Comparative Example 1

The PTFE aqueous slurry used in Example 1 was freeze-dried without additional polymerization and then the total energy and the specific energy were measured using FT4 available from Freeman Technology, and the results are shown in Table 1 and FIG. 2. Since the operation of the freeze-dried product of the PTFE aqueous dispersion had been discontinued due to high load, the data was calculated using one measurement value. The results are listed in Table 1.

Comparative Example 2

The process was performed at the same contents in the same manner as in Example 1, except that sodium dodecyl benzene sulfonate was used as the emulsifier. As a result, the TEM electron microscope images of the aggregate is shown in FIGS. 2 and 3, and as shown in FIG. 2, it was observed that the particles did not have a core-shell form, but an irregular form in which the entire surface of the fluorine polymer as the core was not covered with polymethylmethacrylate, and also, as shown in FIG. 3, the particle size was irregular and non-uniform, and was small. The results of analyzing the characteristics are shown in the following Table 1.

Comparative Example 3

The process was performed in the same manner as in Example 1, except that 48.96 g of polyethylene glycol ether n-nonyl ether 90% aqueous solution having the molecular weight of the ethylene glycol repeating unit of 384 g/mol was added. As a result, an aggregate was observed, and the results of analyzing the characteristics are shown in the following Table 1.

Comparative Example 4

The process was performed in the same manner as in Example 1 except the emulsifier having the ethylene glycol repeating unit of 3 was used instead of the polyethylene glycol trimethylnonyl ether 90% aqueous solution having the molecular weight of the ethylene glycol repeating unit of mainly 384 g/mol was used. The results are listed in Table 1.

TABLE 1

| Classification | Example 1 | Comparative Example 1 | Comparative Example 2 | Comparative Example 3 | Comparative Example 4 |
|---|---|---|---|---|---|
| Total solid content (%) | 34 | 30 | 33 | 33 | 34 |
| PTFE content (%, by TGA) | 77 | 99.8 | 76 | 76 | 77 |
| Tg (° C., by DSC) | 81.1 | — | 81.0 | 80.0 | 81.0 |
| Weight average molecular weight (kg/mol) | 203 | — | 196 | 212 | 197 |
| Average size (nm) | 260 | 220 | 231 | 223 | 290 |
| Specific Energy (mJ/g) | 5.8 | 18.8 | 18.6 | 16.5 | 12.8 |
| Total energy (mJ) | 1,150 | 6,071 | 3,700 | 2,710 | 2,430 |

As seen from the analysis results, in the present invention, Example 1 had a very low specific energy (mJ/g) of 5.8 while having a particle size of a diameter of 260 nm and having uniform particles as shown in FIG. 1, and also showed the total energy of 1, 150 mJ which was very lower than 2,000 mJ or less, and thus, was found to be excellent.

However, when the material of the present invention was not used as the emulsifier (Comparative Examples 2 and 3), the structure was not the structure defined in the present invention (Comparative Example 4), or the repeating unit of ethylene glycol was short in Example 2, it was found that the specific energy (mJ/g) was 10 or more or 15 or more which was poor, and also the total energy was 2,000 mJ or more, 3,000 mJ or more, or 4,000 mJ or more, which showed very low dispersibility.

The invention claimed is:

1. Composite core-shell particles having perfluorinated resin core-polymethylmethacrylate-based resin shell, which is prepared by emulsion polymerization of an acryl monomer using an emulsifier of the following Chemical Formula 1, in a perfluorinated resin particle slurry:

$$R-(-O-C_2H_4-)_n-OH \qquad \text{[Chemical Formula 1]}$$

wherein R is a $C_8$ or higher branched alkyl group, and n is an integer of from 5 to 15, wherein the polymethylmethacrylate-based resin forming the shell comprises 70 wt % or more of the methylmethacrylate monomer, based on the total weight of the polymethylmethacrylate-based resin, and wherein the composite core-shell particles have a cohesive energy value of 10 mJ/g or less and a total surface energy value of 2000 mJ or less, as measured using a flow rheometer.

2. The composite core-shell particles of claim 1, wherein the composite core-shell particles have an average diameter of from 100 to 500 nm.

3. The composite core-shell particles of claim 1, wherein an average diameter of the core of the composite core-shell particles is from 50 nm to 500 nm, and a thickness of the shell of the composite core-shell particles is from 1 to 300 nm.

4. A composite core-shell particle slurry comprising the composite core-shell particles of claim 1.

5. The composite core-shell particle slurry of claim 4, wherein in Chemical Formula 1, the ratio between the molecular weight of the oxyethylene group as a hydrophilic group and the total molecular weight is 0.5.
6. The composite core-shell particle slurry of claim 4, wherein Chemical Formula 1 is an emulsifier of the following Chemical Formula 2:
[Chemical Formula 2]
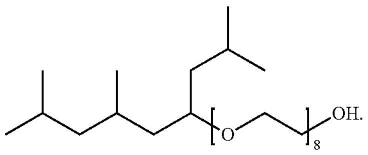
7. An electrode comprising the composite core-shell particles of claim 1 and an electrode active material.
* * * * *